(12) United States Patent
Matsuyama et al.

(10) Patent No.: US 8,185,687 B2
(45) Date of Patent: May 22, 2012

(54) SEMICONDUCTOR STORAGE DEVICE AND METHOD OF CONTROLLING SEMICONDUCTOR STORAGE DEVICE

(75) Inventors: Motohiro Matsuyama, Tachikawa (JP); Tohru Fukuda, Nishitokyo (JP); Hiroyuki Moro, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/016,780

(22) Filed: Jan. 28, 2011

(65) Prior Publication Data
US 2011/0191529 A1 Aug. 4, 2011

(30) Foreign Application Priority Data

Jan. 29, 2010 (JP) ................................. 2010-019547
Jan. 13, 2011 (JP) ................................. 2011-004482

(51) Int. Cl.
G06F 13/00 (2006.01)
G06F 9/32 (2006.01)

(52) U.S. Cl. ................ 711/103; 711/206; 711/E12.009; 707/813

(58) Field of Classification Search .................... None
See application file for complete search history.

(56) References Cited

U.S. PATENT DOCUMENTS

| 4,775,932 | A | 10/1988 | Oxley et al. |
| 6,266,273 | B1 | 7/2001 | Conley et al. |
| 7,196,937 | B2 | 3/2007 | Sugio |
| 7,409,473 | B2 | 8/2008 | Conley et al. |
| 7,849,381 | B2 | 12/2010 | Tomlin |
| 2006/0077721 | A1 | 4/2006 | Sugio |
| 2007/0028035 | A1* | 2/2007 | Nishihara ...................... 711/103 |
| 2008/0002469 | A1 | 1/2008 | Ishimoto |

FOREIGN PATENT DOCUMENTS

| JP | 2564483 | 5/1986 |
| JP | 08-314775 | 11/1996 |
| JP | 2003-186739 | 7/2003 |
| JP | 2004-507007 | 3/2004 |
| JP | 2006-107326 | 4/2006 |
| JP | 2007-334935 | 12/2007 |
| JP | 2008-146253 | 6/2008 |
| JP | 2008-524748 | 7/2008 |
| JP | 2008-524750 | 7/2008 |
| WO | WO 02/17330 | 2/2002 |
| WO | WO 2006/068963 | 6/2006 |
| WO | WO 2006/068993 | 6/2006 |

OTHER PUBLICATIONS

Suzuye & Suzuye, "Information Sheet for preparing an Information Disclosure Statement under Rule 1.56," undated.

* cited by examiner

*Primary Examiner* — Hetul Patel
(74) *Attorney, Agent, or Firm* — Knobbe, Martens, Olson & Bear, LLP

(57) ABSTRACT

According to one embodiment, a semiconductor storage device includes a queuing buffer, a read module, a separating module, a write command issuing module, and a write module. The write command issuing module is configured to add a write address indicated by write pointer information to the management data obtained by the separating module in order to issue a write command, and to automatically queue the write command into the queuing buffer. The write module is configured to supply the write command issued by the write command issuing module to the nonvolatile memory in order to write data into the nonvolatile memory.

10 Claims, 6 Drawing Sheets

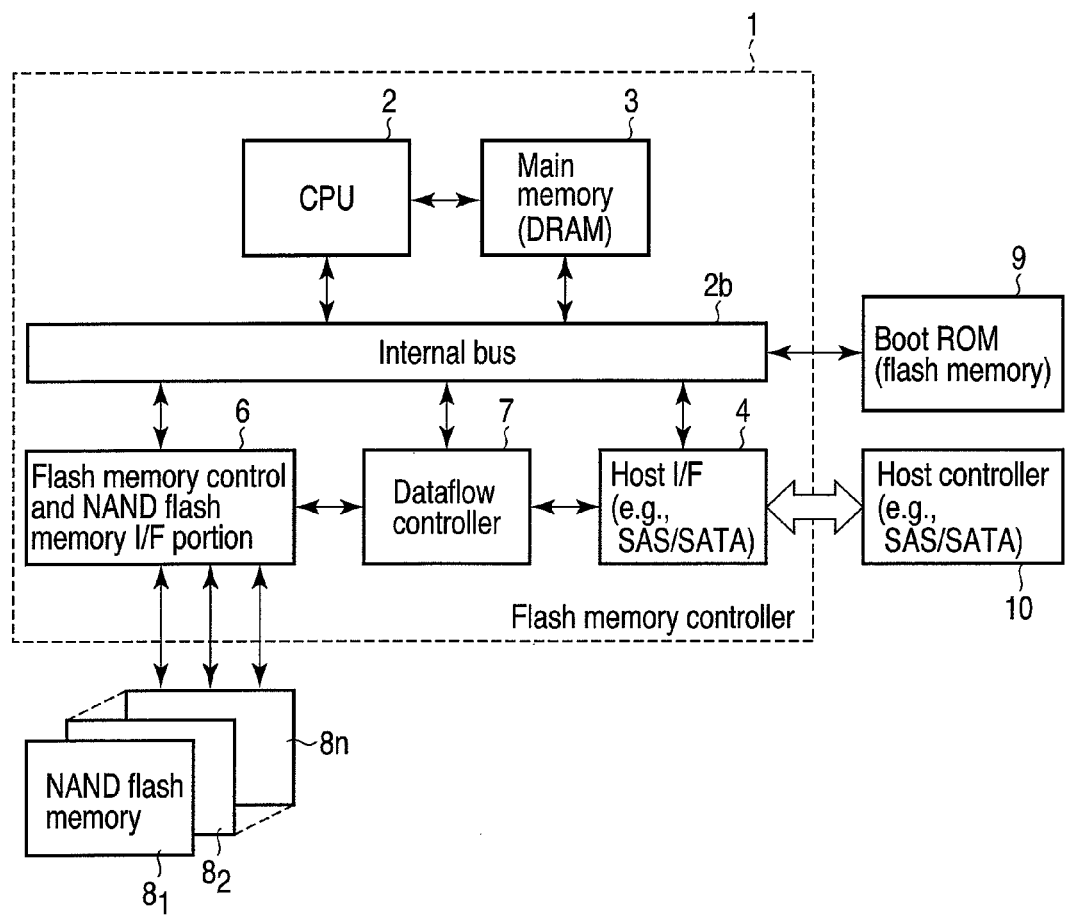
F I G. 1

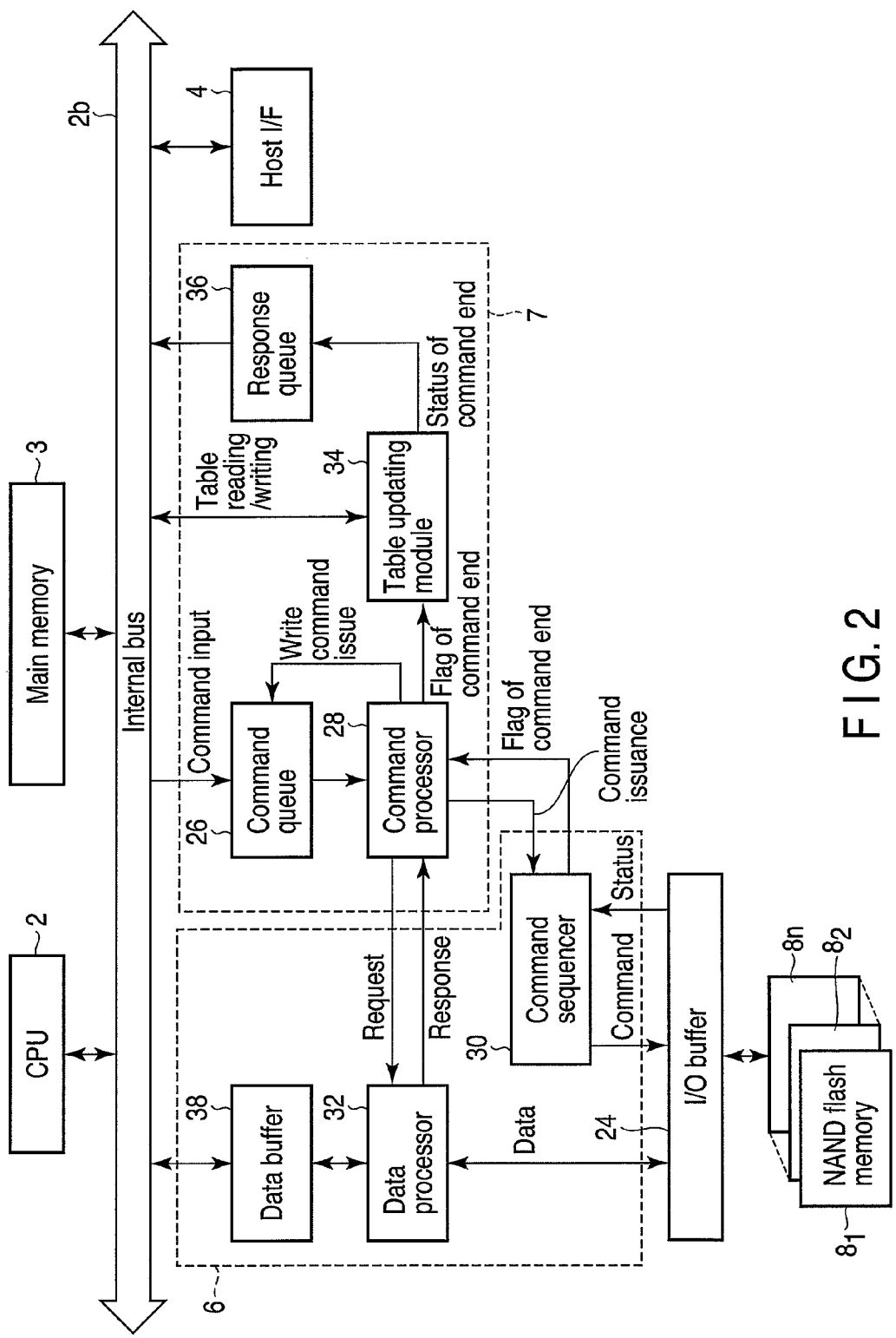
F I G. 2

SEMICONDUCTOR STORAGE DEVICE AND METHOD OF CONTROLLING SEMICONDUCTOR STORAGE DEVICE

CROSS-REFERENCE TO RELATED APPLICATIONS

This application is based upon and claims the benefit of priority from Japanese Patent Application No. 2010-019547, filed Jan. 29, 2010, and No. 2011-004482, filed Jan. 13, 2011, the entire contents of both of which are incorporated herein by reference.

FIELD

Embodiments described herein relate generally to a semiconductor storage device including a nonvolatile memory and a method of controlling a semiconductor storage device.

BACKGROUND

In general, a nonvolatile memory such as a flash memory is not capable of overwriting in data writing. Therefore, if writing and deletion of data are repeated, divided unnecessary regions remain undeleted. Processing to erase these unnecessary regions and gather used regions into a continuous region is called compaction. Conventional compaction processing for a semiconductor storage device is described in, for example, Jpn. Pat. Appln. KOKAI Publication No. 2008-146253 (paragraphs 0050, 0051, 0066, 0067 and 0072 to 0075).

In the storage device described in Jpn. Pat. Appln. KOKAI Publication No. 2008-146253, two-chip 8-gigabit NAND flash memories having a 16-bit input/output are connected in parallel to a 32-bit memory bus. Two chips are simultaneously accessed in parallel in reading and writing. That is, the memory bus comprises two channels of 16-bit buses. Each flash memory is accessed for writing or reading, for example, in 4-kilobyte page units. Thus, 8 kilobytes are collectively accessed as an actual page size.

A RAM incorporated in the storage device comprises a code area or working area for executing a program. The RAM further comprises an address translation table for managing page-by-page virtual addresses, a search table for searching for a normal free block, a counter table for managing the number of invalid pages in each block, a write pointer, a counter for the total number of invalid pages, and an unused page counter.

Data is updated (written) with additional writing. When data is written with the additional writing, a page region corresponding to a physical page address where data before update is stored, such as "0x0060B0" is deleted from a physical address field of the address translation table and cannot be accessed externally. That is, the page region is invalidated.

However, such regions have data written therein and in this condition, cannot even be used as free regions. If such writing is repeated many times, a great number of invalid pages are created. In order for these regions to be usable as free regions again, the data therein needs to be erased to restore the regions (corresponding to the compaction). In this case, other valid data remaining in the deletion block "0x0060" to be erased needs to be saved.

To carry out this restoration processing, for example, the valid data in the target block can be, first, once read into a page buffer as in the case of updating, and the data can be then written into a free region of another block in the additional writing so that the data is substantially saved. That is, a valid page is temporarily updated to completely invalidate its original region. The target block is then erased and the restoration processing is thus achieved.

This restoration processing can be automatically performed when the storage device is on standby or when a system is idle. However, forced restoration processing has little effect in a situation where a great number of unused regions remain and there are only a small number of invalid pages. On the other hand, if the restoration processing is not performed for a long time, there may be a shortage of unused regions leading to access latency. Therefore, a function to determine whether the restoration processing should be really executed and select a target block for the restoration processing is needed somewhere in the system.

Accordingly, the restoration processing, the determination of whether to execute the restoration processing and the selection of a restoration target block are regarded as one operation group, and are packaged in the storage device as a restoration sequence. The restoration sequence is automatically executed in response to a restoration processing execution command from a storage device itself which managed by firmware (FW), (rarely from host's command), usually it is done when the storage device is not busy or put on standby.

Thus, in the device described in Jpn. Pat. Appln. KOKAI Publication No. 2008-146253, the restoration processing, the determination of whether to execute the restoration processing and the selection of a restoration target block are packaged in the storage device as one restoration sequence, and the restoration sequence is executed in response to the restoration processing execution command from the system. As a result of the restoration of the invalid pages in the flash memory, the efficiency of the use of the flash memory can be improved.

However, since the restoration sequence is executed as software on a CPU in this device, the CPU has to perform plural processes to even execute one restoration sequence. There is a problem of decreased performance of the whole system when the processing performance of the CPU deteriorates due to interventions of the software during the execution of the restoration processing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram showing locations in a flash memory controller and its peripheral system according to an embodiment of the present invention.

FIG. 2 is an exemplary detailed block diagram of a flash memory control portion and a dataflow controller in the flash memory controller.

DETAILED DESCRIPTION

Figure 3:
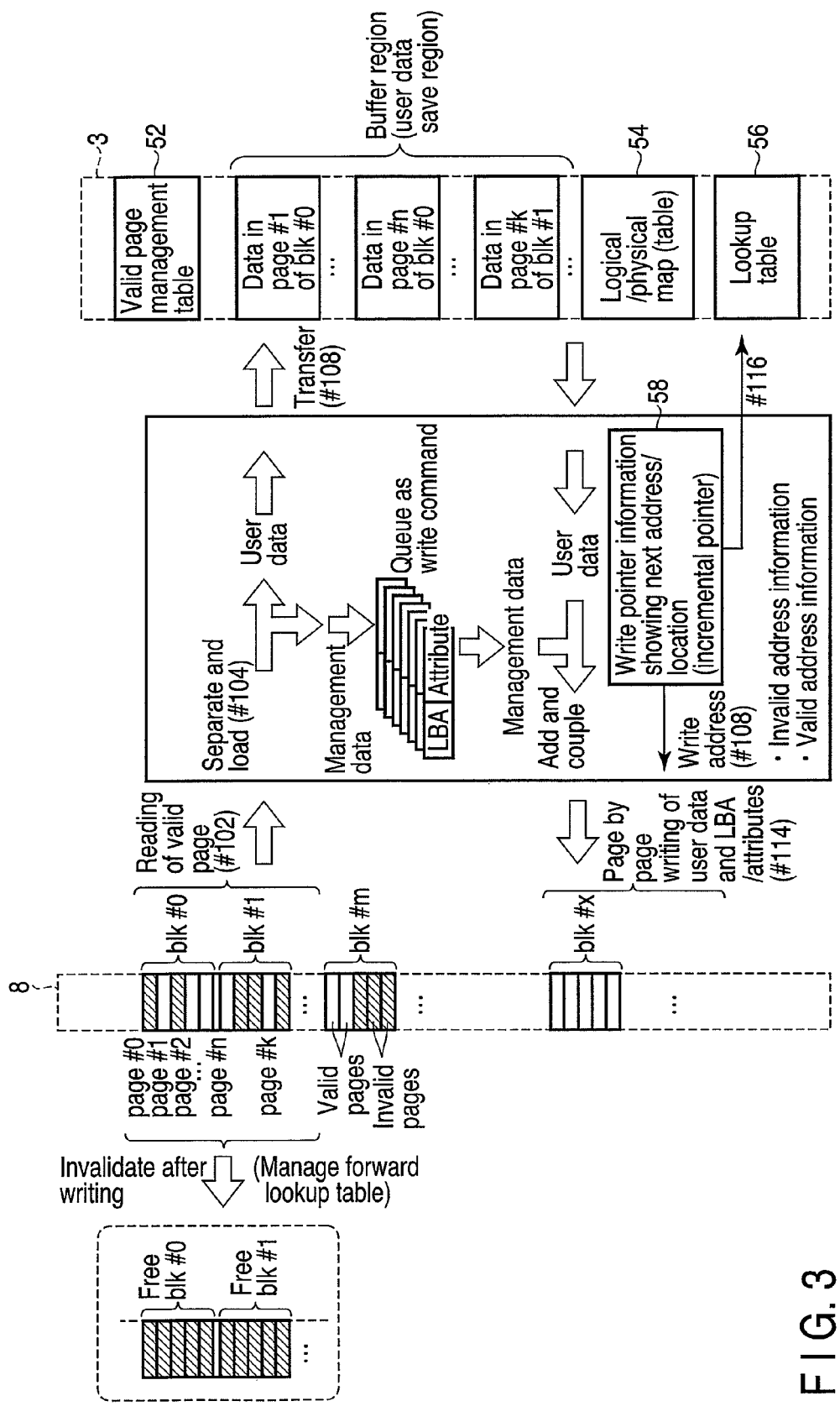
FIG. 3 is an exemplary diagram showing the flow of control and/or data in the NAND flash memory controller during a compaction operation.

Various embodiments will be described hereinafter with reference to the accompanying drawings. In general, according to one embodiment, a semiconductor storage device comprises a queuing buffer, a read module, a separating module, a write command issuing module, a write module. The queuing buffer is configured to queue a command of a nonvolatile memory. The read module is configured to issue a read command of the nonvolatile memory. The separating module is configured to separate data read from the nonvolatile memory by the read module into user data and management data. The write command issuing module is configured to add a write address indicated by write pointer information to the management data obtained by the separating module in order to issue a write command, and to automatically queue the write command into the queuing buffer, the write pointer information managing the write address of the nonvolatile memory. The write module is configured to supply the write command issued by the write command issuing module to the nonvolatile memory in order to write data into the nonvolatile memory.

According to another embodiment, a semiconductor storage device comprises a queuing buffer, a nonvolatile memory (such as NAND flash memory) access module (there are read and write sequence, in later, they are written as 'read module' and 'write module'), a managing compaction information and data module (in later, it is written as 'separating module') and an issuing write command automatically module. The queuing buffer queues some commands which is issued by CPUs. The nonvolatile memory access module is accessing NAND flash memory, for example reads the data from NAND flash memory and/or writes the data to NAND flash memory. The managing compaction information and data module separates of read data in two, control information and user data when read sequence. When the write sequence, it makes write data based on the information of the issuing write command automatically module. The issuing write command automatically module makes write command based on information of a managing compaction information and data module and queuing automatically it into the queuing buffer. After that, this module also adds up a write address, that is, write pointer information. The write pointer information manages the write address of the nonvolatile memory. (More accurate, the write address above is calculated using Logical/Physical map.)

FIG. 1 is a block diagram showing a configuration according to an embodiment. FIG. 1 also shows a host controller which is based on SAS or SATA protocol. The embodiment comprises a plurality of nonvolatile memories, for example, NAND flash memories $8_1, 8_2, \ldots, 8_n$. The NAND flash memories $8_1, 8_2, \ldots, 8_n$ constitute a storage unit of a semiconductor drive (solid state drive: SSD) for example. Usually the number of n is from 2 to 16 which mean there are 2 to 16 memory chips on the SSD drive device. The NAND flash memories $8_1, 8_2, \ldots, 8_n$ are connected to a flash memory controller 1. The flash memory controller 1 comprises a CPU 2, a main memory (DRAM) 3, a flash memory interface control and NAND flash memory I/F portion 6, a dataflow controller 7, and a host interface 4 that are connected to an internal bus 2b.

The flash memory interface 6 is connected to the NAND flash memories $8_1, 8_2, \ldots, 8_n$, and controls access to the NAND flash memories $8_1, 8_2, \ldots, 8_n$. Specifically, the flash memory interface 6 performs address or data control for the NAND flash memories $8_1, 8_2, \ldots, 8_n$. The flash memory interface 6 receives a command from the CPU 2, and transfers data between the NAND flash memories $8_1, 8_2, \ldots, 8_n$ and the main memory 3. The flash memory interface control and NAND flash memory I/F portion 6 also stores logical block address (LBA) information and information on various attributes (flags) therein for use of compaction sequence.

The host interface 4 is connected to a host system 10 by a protocol SAS or SATA, and controls, via the dataflow controller 7, the flow of data exchanged between the host system 10 and the NAND flash memory 8. The host interface 4 is accessed from the host system 10 by the logical block address (LBA). A DRAM, for example, is used as the main memory 3. Temporally buffer data between Host and NAND flash memory, a valid page management table, a lookup table and a logical/physical conversion table are stored in the main memory 3.

An external boot ROM 9 is also connected to the internal bus 2b of the flash memory controller 1. A flash memory is used as the boot ROM 9 by way of example, and the boot ROM 9 includes a firmware. The firmware uses the CPU 2 to issue a read command or write command to the flash memory control and NAND flash memory I/F portion 6 to access the NAND flash memories $8_1, 8_2, \ldots, 8_n$ using I/O commands. Contents programmed in the ROM 9 are transferred to a temporary storage in the CPU 2 or to the main memory 3 when a system is powered on, and the firmware is thereby activated.

FIG. 2 is a detailed block diagram of the flash memory control and NAND flash memory I/F portion 6 and the dataflow controller 7. The flash memory control and NAND flash memory I/F portion 6 accesses the NAND flash memories $8_1, 8_2, \ldots, 8_n$ via an I/O buffer 24. Write data from the internal bus 2b is supplied to the I/O buffer 24 via a data buffer 38 and a data processor 32. Read data from the I/O buffer 24 is supplied to the internal bus 2b via the data processor 32 and the data buffer 38.

The read command or write command from the CPU 2 is written into a command queue 26 via the internal bus 2b (command input). A command format here has only to be a format easily processed by the flash memory control and NAND flash memory I/F portion 6, and is dependent on hardware implementation. When a command is input to the command queue 26 which is not a feature of the embodiment and is therefore not mentioned in particular here, a command processor 28 loads the entered command from the command queue 26 and issues a command to a command sequencer 30 to start accessing the NAND flash memories $8_1, 8_2, \ldots, 8_n$.

When a compaction command is issued from the CPU 2, the compaction command is inputted to the command queue 26 as a read command, at first. The command processor 28 loads the read command from the command queue 26, and issues a command to the command sequencer 30 to start operation. Then, data is read from a relevant block of the NAND flash memories $8_1, 8_2, \ldots, 8_n$ via the I/O buffer 24. A valid page management table (described later) in the main memory 3 manages whether data in each page of each block in the NAND flash memories $8_1, 8_2, \ldots, 8_n$ is valid or invalid. The CPU 2 only provides a read address to a page including valid data, and only reads valid data.

The command sequencer 30 selects one of the NAND flash memories $8_1, 8_2, \ldots, 8_n$, and issues an access command to the selected NAND flash memories $8_1, 8_2, \ldots, 8_n$. In accessing the NAND flash memories $8_1, 8_2, \ldots, 8_n$, the command sequencer 30 requests the data processor 32 to transfer data to the main memory 3 (the LBA/attributes may be included or may not be included). When the data transfer is completed, the data processor 32 returns an end response (including the LBA/attributes) to the command sequencer 30. When the command sequencer 30 reports an end command (the flag of command end) to the command processor 28, the command processor 28 sends the end command to a table updating module 34. At the same time, the data processor 32 separates the data in the valid page read from the NAND flash memories $8_1, 8_2, \ldots, 8_n$ into user data, LBA data, and attribute data necessary for following writing (a write command following the read command in the command queue 26). The data processor 32 then passes the LBA/attribute data to the command processor 28 together with the end response. The attribute data includes, by way of example, information indicating whether to check data by error correction coding (ECC), information on data length, and information on whether the data is encrypted.

After the end of all the read commands in the command queue 26, the operation moves to processing of the write command in the command queue 26 (referred to as following write processing). Details of this processing will be described later with reference to FIG. 3. The command processor 28 loads the write command in the command queue 26, and issues a command to the command sequencer 30 to start operation. The command processor 28 then writes the data into the NAND flash memories $8_1, 8_2, \ldots, 8_n$ via the I/O buffer 24. At the same time, the command sequencer 30 requests the data processor 32 to transfer the data from the main memory 3, and performs data write processing by use of the LBA/attribute data and a write address. The write address is generated in the flash memory controller 1. Specifically, a physical address is calculated from the later-described logical/physical conversion table on the basis the LBA supplied from the host 10. Here, the write address is generated in accordance with an algorithm of the sequential movement in one write, so that the write address can be easily generated.

When the data transfer is completed, the data processor 32 returns an end response to the command sequencer 30. The command processor 28 then passes an end report and information necessary to update the lookup table to the table updating module 34, and updates the data on the main memory 3. The table updating module 34 updates a table on the main memory 3 associated with the finished command. The table updating module 34 updates a valid page management bitmap table and other management tables at the end of writing. Details of the updating processing will be described later. After the end of all the processing, the table updating module 34 sends an end command and a status to a response queue 36, so that hardware command processing is completed. The CPU 2 reads the response queue 36 and can thereby recognize the execution result of the command.

Figure 4:
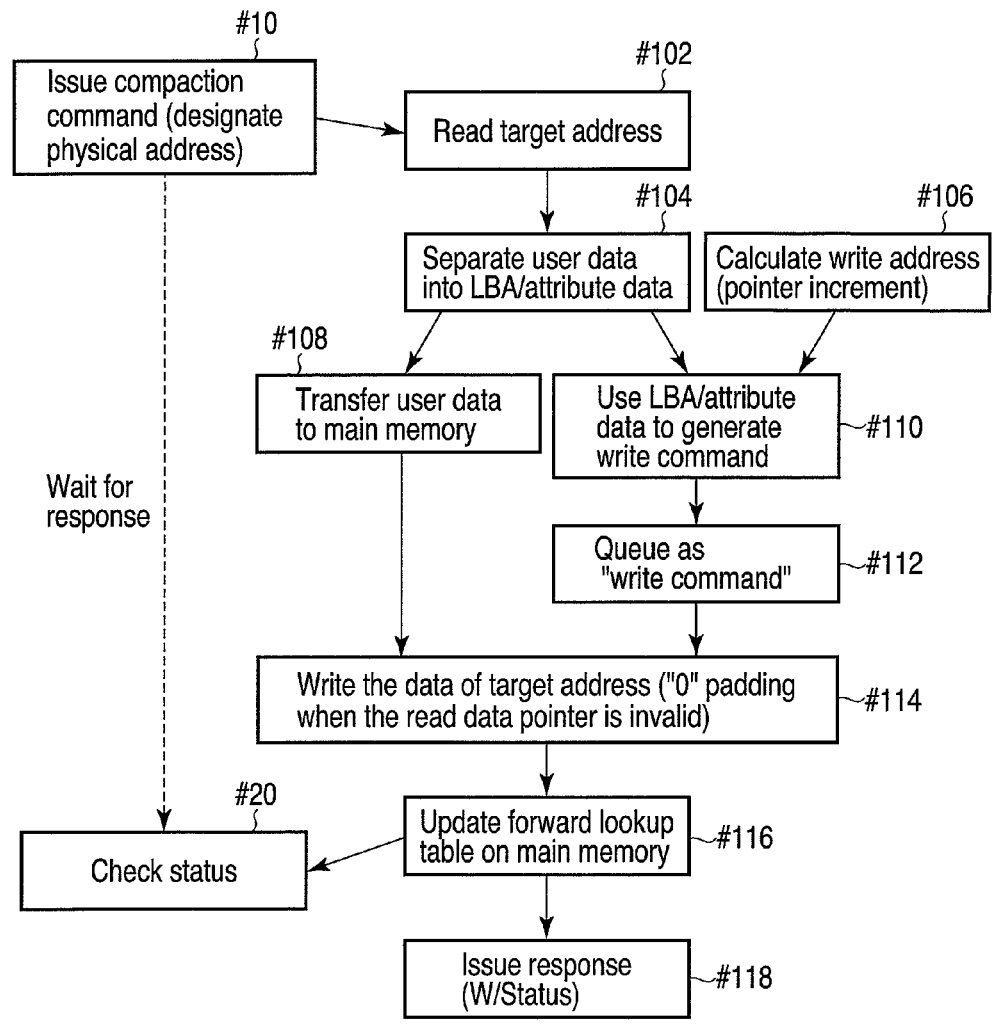
FIG. 4 is an exemplary flowchart showing the compaction operation of the NAND flash memory controller, also showing interface between the NAND flash memory controller and software.

FIG. 3 is a diagram showing the outline of the flow of data during the compaction operation by the flash memory controller 1 (the flash memory control and NAND flash memory I/F portion interface 6 and the dataflow controller 7 in particular) having the configuration described above. FIG. 4 is a flowchart for the flash memory controller 1 which does the operation in FIG. 3. Two blocks (blocks #10 and #20) in the left of FIG. 4 show the processing by the CPU 2. The remaining blocks (blocks #102 to #118) show the processing by the flash memory controller 1 (hardware).

Figure 5:
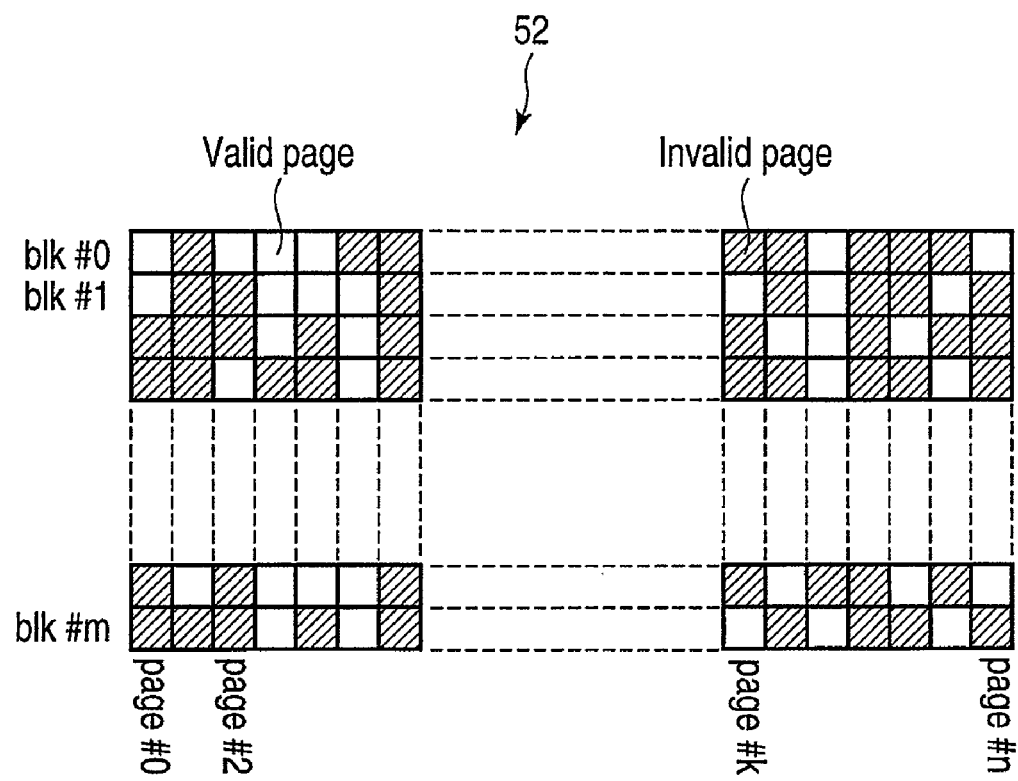
FIG. 5 is an exemplary diagram showing a valid page management table provided in a main memory.

The NAND flash memories $8_1, 8_2, \ldots, 8_n$ constitute one page every predetermined byte, for example, every 2,112 bytes. Predetermined pages, for example, 64 pages constitute one block. Valid pages and invalid pages are mixed in each block. The valid page has data written therein and shows that this data is valid. The invalid page has nothing written therein, or shows that the data written therein before becomes invalid. A valid page management table 52 is provided in the main memory 3 to indicate whether each page of the NAND flash memories $8_1, 8_2, \ldots, 8_n$ is valid or invalid. This table 52 is a bitmap table that indicates whether each page of each block is valid or invalid as shown in FIG. 5. The valid page management table 52 is updated as to whether data is valid or invalid before writing into the NAND flash memories $8_1, 8_2, \ldots, 8_n$ normally ends and a command status is returned to the CPU 2. The main memory 3 comprises a logical/physical conversion table 54 for a conversion between logical addresses and physical addresses, and a lookup table 56 in which the physical addresses in a valid block are arranged in the order of the logical addresses.

First, the CPU 2 issues a compaction command with designating a physical address in the NAND flash memories $8_1, 8_2, \ldots, 8_n$ (block #10 in FIG. 4). The CPU 2 is on standby until the end of compaction processing (Waiting the response). In an actual embodiment, the data access (user data reading or writing) from the host may occur during the compaction processing. The data access from the host is noticed by interruption. There are cases where the data in a compaction target region may become invalid in the middle of the compaction processing, and processing for such cases is taken into account.

The flash memory controller 1 reads data from the valid page of the designated physical address of the NAND flash memories $8_1, 8_2, \ldots, 8_n$ (block #102). The read data is separated into user data and management data (LBA/attribute data) by the data processor 32 (block #104). The user data is transferred to a buffer region (user data save region) in the main memory 3 (block #108).

On the other hand, a write address is calculated by write pointer information which shows next address 58 (included in the command processor 28 in FIG. 2) (block #106). The command processor 28 generates a write command from the write address and the LBA/attribute data (block #110), and inputs the write command to the command queue 26 (block #112).

By the write command after read from the command queue 26, the user data transferred from the main memory 3 is written into the designated address of the NAND flash memories $8_1, 8_2, \ldots, 8_n$ (block #114), through command processor 28 and data processor 32. As in block #114, when the write command located in the command queue 26 is executed to follow the read command executed in block #102 (following write), it is necessary to again determine whether the read data is valid or invalid at a point immediately before the writing. The purpose is to cope with the possibility that the data which has been valid at the time of reading may change into an invalid state at this time. For example, when the user data is overwritten by the host 10, data is written on the NAND flash memories $8_1, 8_2, \ldots, 8_n$ at a physical address different from the physical address where the user data had been written before. The data (read data) that has been present in the physical address of the NAND flash memories $8_1, 8_2, \ldots, 8_n$ in which the user data had been written before becomes invalid. Thus, when the read data is invalid, the invalid data (all "0"s) is written (called "0" padding). Since the current writing is invalid, the write operation itself may have to be stopped, however, it may be difficult from the perspective of hardware to stop the write operation after the write command is loaded from the command queue 26. Therefore, also for simple hardware, writing data process does not stop. In block #116, the table updating module 34 updates the lookup table 56 in the main memory 3. In block #118, the table updating module 34 then sends an end command and a status to the response queue 36, so that hardware command processing is completed.

The CPU 2 reads the response queue 36 and thereby recognizes the execution status of the command (block #20).

Figure 6:
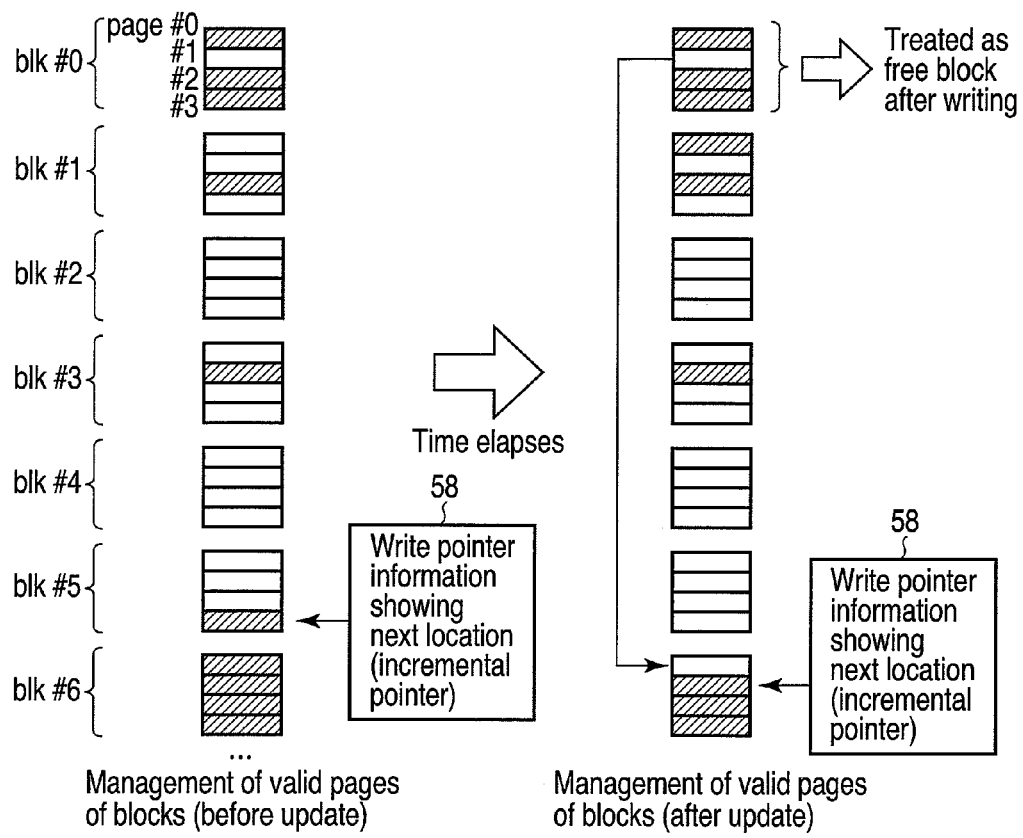
FIG. 6 is an exemplary diagram showing the operation of a write pointer and its information, which shows next target address/location, and the update of a lookup table during the compaction operation of the NAND flash memory controller.
Figure 6:
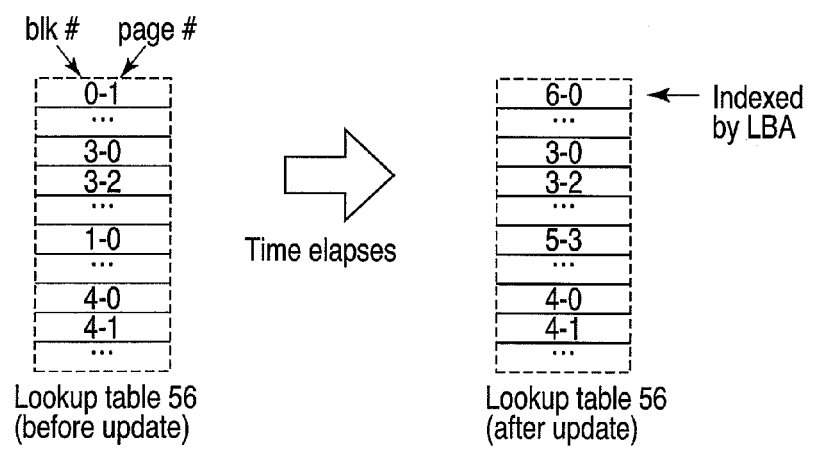

FIG. 6 is a diagram showing the operation of the write pointer information 58 and the update of the lookup table 56. The left of FIG. 6 shows that the valid/invalid pages of the NAND flash memories $8_1, 8_2, \ldots, 8_n$ and the lookup table 56 are in the condition (before update) at a certain time. Suppose that the position indicated by the write pointer information 58 is a page #3 of a block #5. Suppose that a block #0 is selected as a target for compaction in such a situation. A block which includes any valid page and which has the smallest block number is selected as the compaction target based on information in the valid page management table 52. As the valid page management table 52 is a two-dimensional bitmap table, blocks to be candidates for compaction can be easily listed. The valid page of a block #0 is a page #1 alone.

For the compaction, a free block (all pages are invalid) #6 is acquired first, and data in the valid pages is copied in order starting with the head page of this block. A status after the data in the page #1 of the block #0 is copied to a page #0 of the block #6 is shown in the right of FIG. 6. The lookup table 56 is then updated so that the position of the logical block address of the copied data (the page #1 of the block #0) may indicate the position (the page #0 of the block #6) of the copy destination. Moreover, the valid page management table 52 is updated (the page #1 of the block #0 is invalidated) so that the block #0 which has run out of the valid pages may be treated as a free block. As a result of copying the data in the page #1 of the block #0 to the page #0 of the block #6, the write pointer information 58 moves to the page #1 of the block #6. The page #3 of the block #5 is changed from the invalid state to the valid state due to the write processing of the user data performed in parallel with compaction processing. FIG. 6 shows one increment of the write pointer information 58, writing of data to the position which has been indicated by the write pointer information 58 so far, and the updating of the lookup table 56 (the page #3 of the block #5). FIG. 6 also shows that a logical block address (a page #0 of block #1) is invalidated due to a logical block address redundancy.

As described above, according to the first embodiment, when the compaction processing of the NAND flash memories $8_1, 8_2, \ldots, 8_n$ is performed, the CPU 2 has only to issue a compaction command with designating a logical block address. In response to this command, the flash memory controller 1 reads data in the valid page from the designated block, and adds the write address generated by the write pointer information 58 to the management data (LBA/attribute data) separated from the read data in order to generate a write command. The user data from the main memory 3 is added and coupled to the write command, and the user data are written in the designated address of the NAND flash memories $8_1, 8_2, \ldots, 8_n$ page by page. After the writing, the block from which the data has been read is invalidated, and the lookup table 56 is updated. As a result, the compaction operation (read processing, following write processing and lookup table update processing) can be performed by one command from the CPU 2, so that the CPU processing load can be reduced. Moreover, since there is no interruption by software processing, the processing performance of the whole system is increased. Before writing, it is necessary to check the read data is invalid or not. When the read data is invalid, handling is, for example, writing itself is stopped and/or the invalid data such as all '0's is written instead. This makes it possible to cope with the case where the read data changes into an invalid state in the middle of the compaction. Furthermore, the present invention can also be carried out to cause a computer to execute predetermined means, to cause a computer to function as predetermined means, or to cause a computer to enable a predetermined function. Alternatively, the present invention can also be carried out as a computer-readable recording medium in which a program is recorded.

Still further, the present invention is not limited to the compaction, and is also applicable to the movement of data at regular periods (regular refreshment) which is a characteristic of the nonvolatile memory, or to read-modify-write (RMW).

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, although the semiconductor drive (solid-state drive [SSD]) controlled by the host 10 has been taken as an example to describe the present invention, the present invention is not limited to this. The present invention is also applicable to, for example, silicon audio devices or memory media card. The accompanying claims and their equivalents are intended to cover such forms or modifications as would fall within the scope and spirit of the inventions.

What is claimed is:

1. A semiconductor storage device comprising:
   a queuing buffer configured to queue commands for nonvolatile memory;
   a read module configured to issue a command to read the nonvolatile memory;
   a data processing module configured to process data read from the nonvolatile memory by the read module into user data and management data;
   a write-command-issuing module configured to add to the management data obtained by the data processing module a write address indicated by write pointer information in order to issue a write command, and to automatically queue the write command into the queuing buffer, the write pointer information managing a write address of the nonvolatile memory; and
   a write module configured to process the write command issued by the write-command-issuing module, such that the write command is provided to the nonvolatile memory in order to write data to the nonvolatile memory.

2. The device of claim 1, further comprising a determination module configured to determine, when the write module starts processing, whether data read from the nonvolatile memory by the read module is valid or invalid,
   wherein the write module is configured to write invalid data to the nonvolatile memory when the determination module determines that the read data is invalid.

3. The device of claim 1, further comprising a determination module configured to determine, when the write module starts processing, whether data read from the nonvolatile memory by the read module is valid or invalid, wherein the write module is configured to stop the write processing when the determination module determines that the read data is invalid.

4. The device of claim 1, further comprising an updating module configured to update a lookup table after write processing by the write module.

5. The device of claim 1, wherein the nonvolatile memory comprises a block comprising a predetermined number of pages, each page comprising a predetermined byte, and accessed page by page, data is written starting with a head page of a free block in which all pages are invalid, and the write pointer information is incremented in response to writing in one page.

6. A method of controlling a semiconductor storage device comprising a nonvolatile memory, the method comprising:

issuing a read command to the nonvolatile memory;

processing data read from the nonvolatile memory in accordance with the read command into user data and management data;

adding to the management data obtained by the processing, a write address for the nonvolatile memory indicated by write pointer information in order to issue a write command, the write pointer information managing a write address; and writing data to the nonvolatile memory by providing the write command to the nonvolatile memory.

7. The method of claim 6, further comprising determining at the start of writing whether data read from the nonvolatile memory is valid or invalid, wherein writing comprises writing invalid data to the nonvolatile memory based on when the data read from the nonvolatile memory is determined to be invalid.

8. The method of claim 6, further comprising determining at the start of writing whether data read from the nonvolatile memory is valid or invalid, wherein writing is stopped based on when the data read from the nonvolatile memory is determined to be invalid.

9. The method of claim 6, further comprising updating a lookup table after writing.

10. The method of claim 6, further comprising updating a valid page management table after writing, the valid page management table managing data indicating whether data in each page of the nonvolatile memory is valid or invalid.

* * * * *